(12) United States Patent
Ishikawa et al.

(10) Patent No.: US 10,088,698 B1
(45) Date of Patent: Oct. 2, 2018

(54) OPTICAL DEVICE

(71) Applicant: SUMITOMO OSAKA CEMENT CO., LTD., Tokyo (JP)

(72) Inventors: Yoshizumi Ishikawa, Tokyo (JP); Shingo Takano, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 15/939,315

(22) Filed: Mar. 29, 2018

(30) Foreign Application Priority Data

Mar. 31, 2017 (JP) ................................ 2017-071632

(51) Int. Cl.
  *G02F 1/035* (2006.01)
  *G02F 1/01* (2006.01)
(52) U.S. Cl.
  CPC .................................. *G02F 1/011* (2013.01)
(58) Field of Classification Search
  CPC .......... G02F 1/025; G02F 1/225; G02F 1/035; G02F 1/011; G02F 2001/212
  See application file for complete search history.

(56) References Cited

U.S. PATENT DOCUMENTS

| | | | | |
|---|---|---|---|---|
| 6,192,167 B1 * | 2/2001 | Kissa | .................... | G02F 1/0356 385/14 |
| 6,429,959 B1 * | 8/2002 | Gopalakrishnan | .... | G02F 1/0316 359/254 |
| 6,741,379 B2 | 5/2004 | Kaitoh et al. | | |

FOREIGN PATENT DOCUMENTS

JP      4027109      12/2007

OTHER PUBLICATIONS

Masashi Hotta, et al., "Leakage Loss Analysis of Conductor Backed Coplanar Waveguide with Air-Gap-Spacing Dielectric Sheets," IEICE Trans. Electron., vol. E85-C, No. 7, Jul. 2002, pp. 1519-1522.

* cited by examiner

*Primary Examiner* — Jennifer Doan
(74) *Attorney, Agent, or Firm* — JCIPRNET

(57) ABSTRACT

An optical device includes: an electro-optical element; a connector for input and output of an electric signal; a relay substrate electrically connecting the connector and the optical element; a pair of support parts supporting the relay substrate; and a housing accommodating the optical element, the relay substrate, and the pair of support parts, in which the optical element includes a substrate having an optical waveguide formed therein, and a modulation electrode formed on a surface of the substrate, the relay substrate includes a dielectric substrate, and a signal electrode and a ground electrode provided on one principal surface of the dielectric substrate, the signal electrode and the ground electrode are electrically connected to the modulation electrode and the connector, the support parts clamps the relay substrate, and an air gap is formed between the other principal surface of the relay substrate and an inner bottom surface of the housing.

7 Claims, 5 Drawing Sheets

OPTICAL DEVICE

CROSS-REFERENCE TO RELATED APPLICATIONS

This application claims the benefit of Japanese Patent Application No. 2017-071632 filed Mar. 31, 2017, the disclosure of which is herein incorporated by reference in its entirety.

BACKGROUND OF THE INVENTION

Field of the Invention

The present invention relates to an optical device.

Description of Related Art

In the related art, as an optical device, an optical modulator having an electro-optical element having an optical waveguide and a modulation electrode, a housing which accommodates the electro-optical element, and a relay substrate which transmits a modulation signal input from the outside to the modulation electrode is known (refer to, for example, Japanese Patent No. 4027109).

The electro-optical element of the optical modulator uses a material exhibiting an electro-optic effect, such as a $LiNbO_3$ crystal or an electro-optical polymer material, as a substrate, and has a configuration in which an optical waveguide is formed in the substrate and a modulation electrode is formed on the optical waveguide.

The housing of the optical modulator has a connector part for inputting a modulation signal from the outside. The connector part has a coaxial pin.

The relay substrate of the optical modulator has a dielectric substrate and an electrode formed on the dielectric substrate. The relay substrate is disposed between the coaxial pin of the connector part and the electro-optical element in the housing and transmits the modulation signal input to the connector part to the modulation electrode.

In general, in such an optical modulator, it is required that a modulation signal (an electric signal) input from the outside to the connector part is propagated to the electro-optical element without a loss. Further, an optical modulator (an optical device) which deals with a higher frequency electric signal is required with an increase in the speed of optical communication in recent years.

Here, a coplanar line (Coplanar Waveguide: CPW) is often used for an input/output section of the modulation electrode and the electrode configuration of the relay substrate in consideration of ease of connection.

Further, in the relay substrate, a substrate having a conductor backed coplanar waveguide (CBCPW) configuration in which a conductor is also disposed on the surface opposite to the surface on which a coplanar line is formed, and a ground electrode on the side of one principal surface and the conductor on the side of the other principal surface are connected to each other is often used.

As one of factors which deteriorate a transmission characteristic in the relay substrate having a CBCPW structure, a radiation loss to the dielectric substrate can be cited. The radiation loss to the dielectric substrate changes according to the shape and size of the electrode of the relay substrate and the dielectric characteristic of the dielectric substrate of the relay substrate.

As one method of suppressing the radiation loss of the relay substrate having the CBCPW structure, a method of performing grooving on the surface on the side opposite to the surface on which the electrode is formed, in the dielectric substrate of the relay substrate having the CBCPW structure, has been proposed (refer to, for example, Non-Patent Literature 1: "Leakage Loss Analysis of Conductor Baked Coplanar Waveguide with Air-Gap-Spacing Dielectric Sheets", Hotta, et al., IEICE TRANS. ELECTRON, vol. E85-C, NO. 7, July 2002). The groove which is formed can be considered as a "layer composed of a low dielectric constant material" in considering the electrical characteristics of the relay substrate.

SUMMARY OF THE INVENTION

However, in the configuration described in Non-Patent Literature 1, since fine grooves are processed on the dielectric substrate, it leads to an increase in manufacturing cost. Further, in the configuration described in Non-Patent Literature 1, the material of the dielectric substrate, which can be applied, is limited to a material that can maintain mechanical strength even if the grooving is performed. For this reason, the range of choice of the material of the dielectric substrate is narrowed.

From these, in order to realize a high-performance optical device having a relay substrate capable of suppressing a propagation loss of a signal, a technique allowing the same effect as that in the configuration described in Non-Patent Literature 1 to be realized with a simpler configuration is required.

Further, the above problem is not limited to the optical modulator using an electro-optic effect and can also likewise occur in an electro-absorption modulator using an electro-absorption effect. For this reason, improvement is likewise required.

The present invention has been made in view of such circumstances and has an object to provide an optical device which realizes high-performance optical modulation.

In order to solve the above problem, according to an aspect of the present invention, there is provided an optical device including: an optical element; a connector to or from which an electric signal is input or output; a relay substrate which electrically connects the connector and the optical element; a pair of support parts supporting the relay substrate; and a housing to which the connector is fixed and which accommodates the optical element, the relay substrate, and the pair of support parts, in which the optical element includes a substrate having an optical waveguide formed therein, and a modulation electrode formed on a surface of the substrate, the relay substrate includes a dielectric substrate, a signal electrode provided on one principal surface of the dielectric substrate, and a ground electrode provided on the one principal surface, the signal electrode and the ground electrode are electrically connected to the modulation electrode and the connector, the pair of support parts clamps the relay substrate when viewed in a plan view, and an air gap is formed between an other principal surface of the relay substrate and an inner bottom surface of the housing.

In an aspect of the present invention, a surface of each of the pair of support parts may be formed of a conductive material, and the pair of support parts may be electrically connected to the ground electrode and the housing.

In an aspect of the present invention, each of the pair of support parts may be a member formed separately from the housing, and be fixed to an internal space of the housing.

In an aspect of the present invention, each of the pair of support parts may have a slit into which a peripheral edge portion of the relay substrate is adapted to be inserted.

In an aspect of the present invention, the substrate may have an electro-optic effect.

In an aspect of the present invention, the signal electrode and the ground electrode may form a coplanar line.

In an aspect of the present invention, the optical device may be an optical modulator.

According to the present invention, it is possible to provide an optical device which realizes high-performance optical modulation.

DETAILED DESCRIPTION OF THE INVENTION

Figure 1:
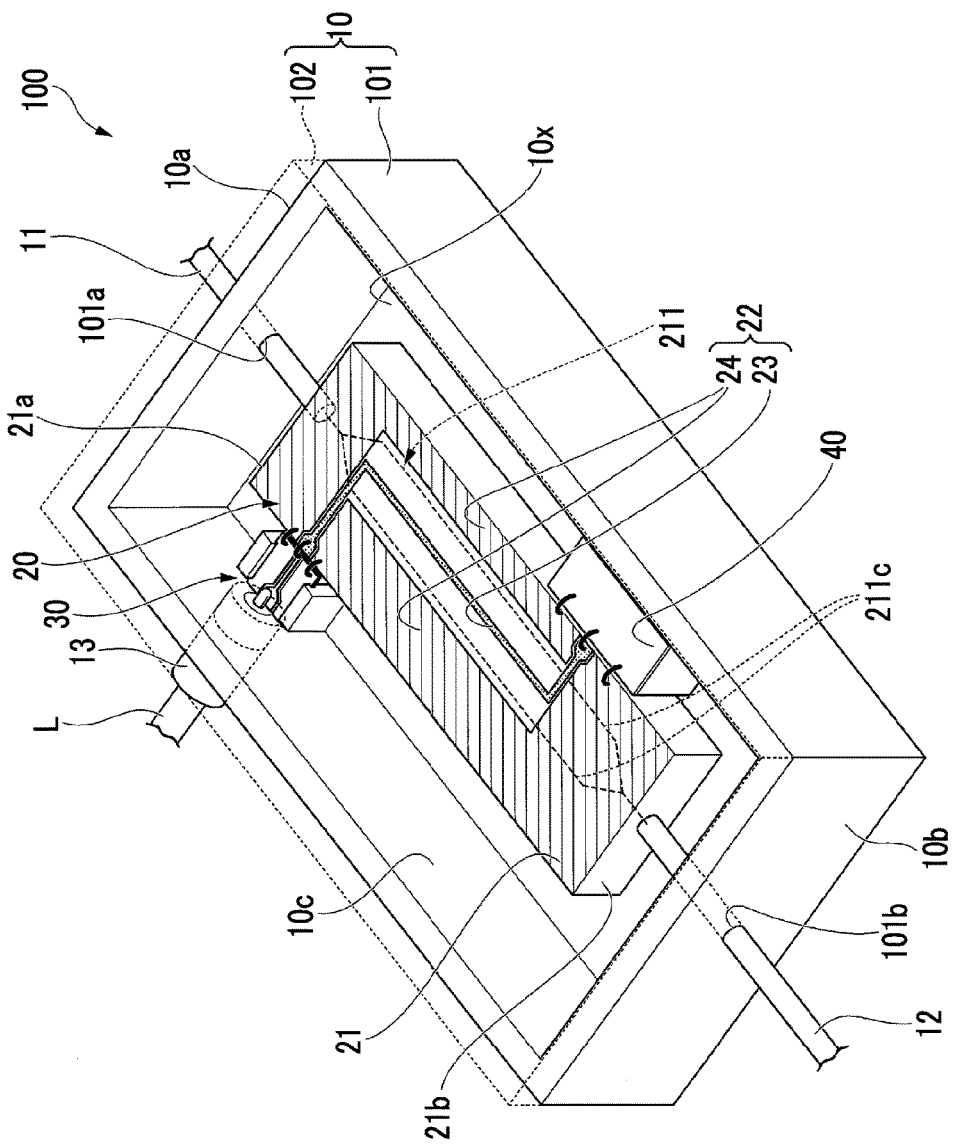
FIG. 1 is a schematic perspective view showing an optical device of an embodiment.

Hereinafter, an optical device 100 according to an embodiment of the present invention will be described with reference to FIG. 1 to FIG. 5. In all of the following drawings, in order to make the drawing easy to see, dimensions, a ratio, or the like of each constituent element is appropriately made different.

FIG. 1 is a schematic perspective view showing the optical device 100 of this embodiment. As shown in this drawing, the optical device 100 of this embodiment is an optical modulator having a housing 10, an electro-optical element 20, a relay section 30, and a terminal end section 40.

Housing

The housing 10 is a box-shaped member having a rectangular shape when viewed in a plan view and accommodating the electro-optical element 20. The housing 10 has a bottomed case 101 having an open upper portion, and a lid material 102 for closing an opening portion of the upper portion of the case 101.

A material for forming the housing 10 may be selected according to the characteristics of the electro-optical element 20 as long as it does not inhibit the operation of the electro-optical element 20, and is not particularly limited. As the material for forming the housing 10, for example, stainless steel or Kovar can be used. The coefficient of linear expansion of Kovar is closer to the coefficient of linear expansion of ceramic than stainless steel, for example.

When the optical device 100 is mounted on another device, the housing 10 is connected (grounded) to the reference potential point. For this reason, it is preferable that the surfaces of the case 101 and the lid material 102 are covered with a metal material having higher electric conductivity than the material for forming the case 101 or the lid material 102. As such a metal material, nickel or gold can be given as an example.

A through-hole 101a is provided in the case 101 on one end side 10a of the housing 10. An optical fiber 11 is inserted into the through-hole 101a. The optical fiber 11 is connected to one end of the electro-optical element 20.

A through-hole 101b is provided in the case 101 on the other end side 10b of the housing 10. An optical fiber 12 is inserted into the through-hole 101b. The optical fiber 12 is connected to the other end of the electro-optical element 20.

A coaxial connector (a connector) 13 for inputting a modulation signal (an electric signal) is provided on a side surface 10c of the housing 10.

The electro-optical element 20, the relay section 30, and the terminal end section 40 are mounted on a bottom surface (an inner bottom surface) 10x of the internal space of the housing 10.

Electro-Optical Element

The electro-optical element 20 has a substrate 21 and a modulation electrode 22.

The substrate 21 is a plate-shaped member in which a material having an electro-optic effect is used as a forming material. As the material for forming the substrate 21, a crystalline material such as lithium niobate (LiNbO$_3$:LN), lithium tantalate (LiTaO$_3$), or lanthanum zirconate titanate (PLZT) can be used.

In a case where the crystalline material is used as the material for forming the substrate 21, an optical waveguide can be formed by using a known technique such as thermal diffusion of metal such as Ti on a plate material using a crystalline material as a forming material, rib formation by etching, or proton exchange.

Further, as the material for forming the substrate 21, an organic electro-optical polymer material in which a nonlinear optical organic compound is dispersed in a polymer material can also be used.

In a case where the organic electro-optical polymer material is used as the material for forming the substrate 21, first, silicon, quartz, or the like is used as a base material, and a high refractive index layer and a low refractive index layer are laminated on the base material by using two or more types of polymer materials having different refractive indexes. Further, an optical waveguide is patterned by performing etching or imprint forming on the high refractive index layer or the low refractive index layer. At this time, the substrate 21 can be formed by using an organic electro-optical polymer material for at least a part of the high refractive index layer and the low refractive index layer.

The substrate 21 has an optical waveguide 211 formed therein. As shown in FIG. 1, the optical waveguide 211 of the optical device 100 of this embodiment is a single Mach-Zehnder type optical waveguide. The optical waveguide 211 has two parallel optical waveguides 211c extending in a longitudinal direction of the substrate 21.

The modulation electrode 22 includes a signal electrode 23 and a ground electrode 24. The modulation electrode 22 is provided on the surface of an upper portion of the substrate 21. In this embodiment, the modulation electrode 22 has one signal electrode 23 and two ground electrodes 24.

The modulation electrode 22 is provided at a position that does not overlap the two parallel optical waveguides 211c configuring the optical waveguide 211 in the field of view (when viewed in a plan view) from a normal direction to the substrate 21. Specifically, the signal electrode 23 is provided between the two parallel optical waveguides 211c configuring the optical waveguide 211 in the same field of view. The ground electrode 24 is provided between the optical waveguide 211c and the peripheral edge of the substrate 21 in the same field of view.

The modulation electrode 22 changes the refractive index of the optical waveguide 211 by causing an electro-optic effect to occur in the optical waveguide 211 due to an electric field applied between the signal electrode 23 and the ground electrode 24. In this way, the optical modulation of light propagating through the optical waveguide 211 is performed.

The type of the modulation electrode 22 is not particularly limited. For example, in an electro-optical element using a crystalline substrate such as $LiNbO_3$ as the substrate 21, a coplanar line is often adopted. Further, in an electro-optical element using a substrate using an organic electro-optical polymer material as the substrate 21, a microstrip line is often adopted.

In the optical device 100 shown in FIG. 1, the number of modulation electrodes 22 is one. However, the number of modulation electrodes 22 may be plural. In a case where the optical device has a plurality of modulation electrodes 22, the disposition or the number of the modulation electrodes 22 may be set according to the orientation of a crystal axis of the substrate 21 or a modulation form of the electro-optical element 20.

It is preferable that a connection pad is provided at an end portion of the modulation electrode 22 in order to facilitate electrical connection with a relay substrate 31. A coplanar line or a grounded coplanar line can be adopted as the type of an electrode in the connection pad.

Relay Section

The relay section 30 relays a modulation signal, which is an electric signal that is supplied from the outside, and outputs the modulation signal to the electro-optical element 20. The specific configuration of the relay section 30 will be described later.

Figure 2:
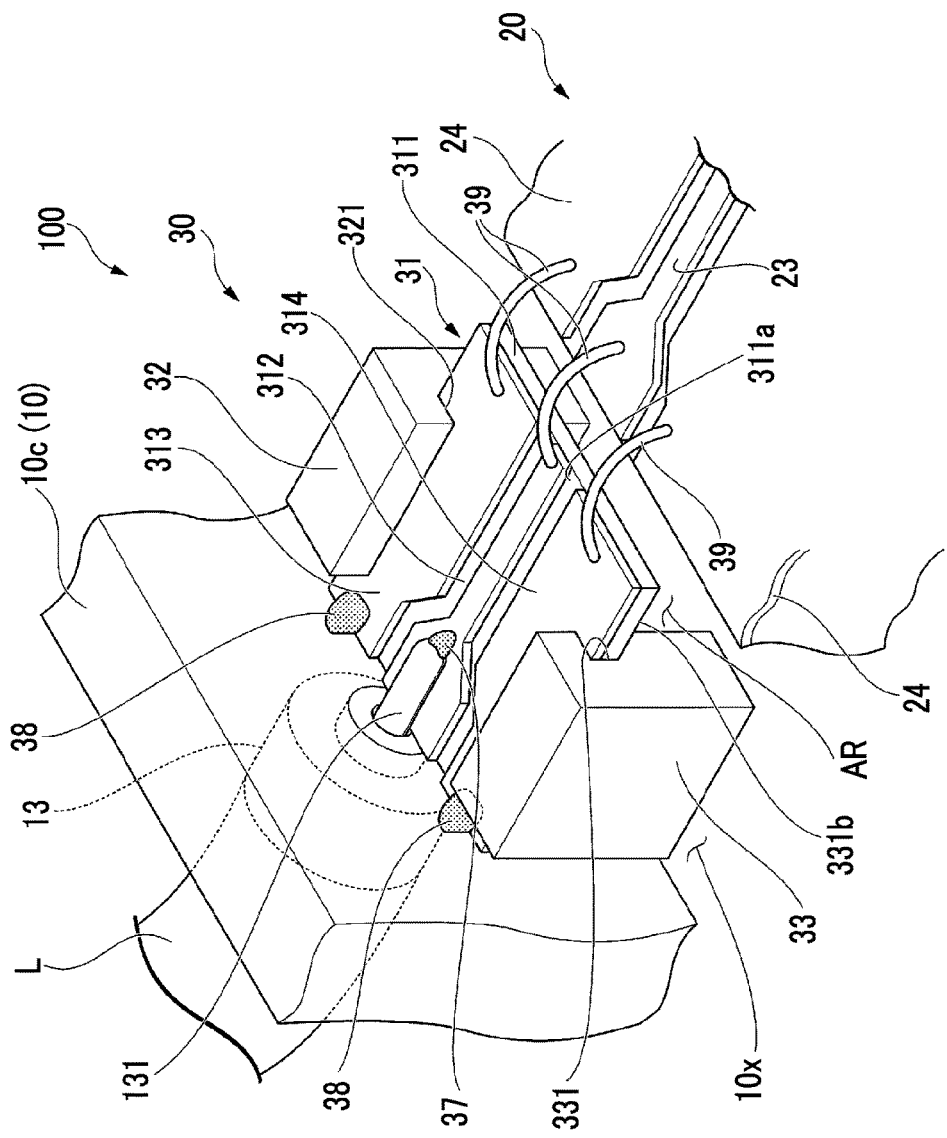
FIG. 2 is a schematic enlarged view showing the vicinity of a relay section.

FIG. 2 is a schematic enlarged view showing the vicinity of the relay section 30. As shown in this drawing, the relay section 30 has the relay substrate 31 and a pair of support parts 32 and 33.

Relay Substrate

The relay substrate 31 has a dielectric substrate 311, a signal electrode 312, and ground electrodes 313 and 314. The signal electrode 312 and the ground electrodes 313 and 314 are provided on a principal surface 311a on one side of the dielectric substrate 311 and form a coplanar line as a high frequency signal line.

The signal electrode 312 and the ground electrodes 313 and 314 correspond to a "coplanar line" in the present invention.

As a material for forming the dielectric substrate 311, although there is no particular limitation, a material having a low relative dielectric constant can be suitably used. As the material for forming the dielectric substrate 311, for example, a material having a relative dielectric constant of 10 or less can be suitably used. As the dielectric substrate 311, for example, a ceramic substrate using ceramics such as $Al_2O_3$ or AlN as a forming material, a sapphire substrate, or a quartz substrate can be used.

In the present invention, as the dielectric substrate 311, for example, a plate material formed by shaping such a ceramic substrate into a rectangular shape when viewed in a plan view can be used, and thus microfabrication of grooves, recesses, or the like is not required. Further, the dielectric substrate 311 is preferably thin in order to suppress a radiation loss of the modulation signal propagating through the signal electrode 312 and the ground electrodes 313 and 314. It is favorable if the thickness of the dielectric substrate 311 is set according to the mechanical strength of the relay substrate 31 or the frequency of the modulation signal which is propagated.

The pair of support parts 32 and 33 clamps the relay substrate 31 when viewed in a plan view, and supports the relay substrate 31. The pair of support parts 32 and 33 is mounted on the bottom surface 10x of the housing 10. The pair of support parts 32 and 33 is easily assembled or handled, and therefore, it is preferable that the support parts 32 and 33 are members formed separately from the housing 10. The pair of support parts 32 and 33 may be formed integrally with the housing 10.

The support parts 32 and 33 are preferably formed of a conductive material such as a metal material, for example. As a material for forming the support parts 32 and 33, for example, the same material as the material for forming the housing 10 can be adopted. It is favorable if at least the surface of each of the support parts 32 and 33 is formed of a conductive material, and the entirety of each of the support parts 32 and 33 may be formed of a conductive material.

In this embodiment, the support part 32 and the support part 33 are substantially rectangular parallelepiped members. In the posture of supporting the relay substrate 31, the support part 32 has a slit 321 on the surface facing the support part 33. Similarly, the support part 33 has a slit 331 on the surface facing the support part 32. When the support parts 32 and 33 support the relay substrate 31, the peripheral edge portions of the relay substrate 31 are inserted into the slits 321 and 331. As long as the relay substrate 31 can be inserted, the cross-sectional shapes of the slits 321 and 331 can adopt various shapes.

One end of the signal electrode 312 is electrically connected to the signal electrode 23 provided on the surface of the substrate 21 of the electro-optical element 20 by a bonding wire 39.

One end of each of the ground electrodes 313 and 314 is electrically connected to the ground electrode 24 provided on the surface of the substrate 21 of the electro-optical element 20 by the bonding wire 39.

Further, the other end of the signal electrode 312 is electrically connected to a center conductor 131 of the coaxial connector 13 provided on the side surface 10c of the housing 10. The center conductor 131 and the signal electrode 312 are connected to each other by a brazing material 37 such as solder or gold tin, for example.

The other end of each of the ground electrodes 313 and 314 is electrically connected to an external conductor. In this embodiment, the housing 10 is used as the external conductor.

Further, the ground electrodes 313 and 314 are respectively in contact with the support parts 32 and 33 formed of a conductive material, in the slits 321 and 331. The support parts 32 and 33 are mounted on and electrically connected to the bottom surface 10x of the housing 10. In this way, the electro-optical element 20 is grounded through the ground electrodes 313 and 314 and the support parts 32 and 33. The ground electrodes 313 and 314 and the support parts 32 and 33 may be connected by a brazing material such as solder or gold tin, a conductive adhesive, or the like.

Further, the other end of each of the ground electrodes 313 and 314 may be connected to the side surface 10c of the housing 10 by a brazing material 38 such as solder or gold tin, a conductive adhesive, or the like.

The mounting of the relay section 30 is performed, for example, in the following procedure.

Figure 3:
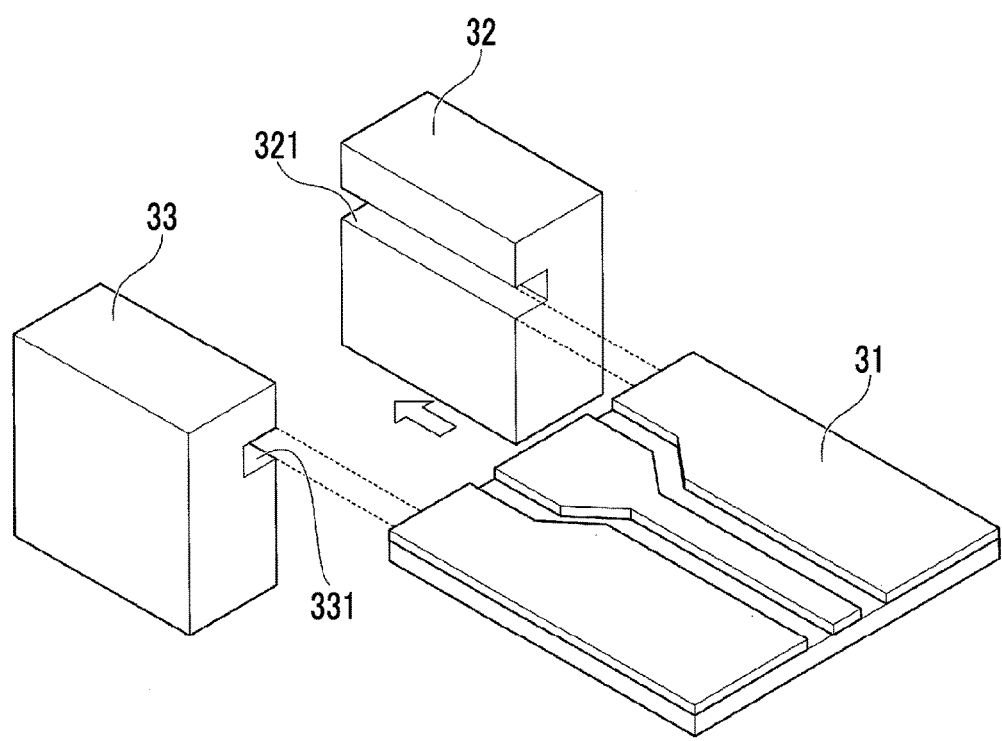
FIG. 3 is an explanatory diagram showing a state of assembling the vicinity of the relay section.

First, as shown in FIG. 3, the peripheral edge portions of the relay substrate 31 are inserted into the slits 321 and 331 of the pair of support parts 32 and 33, and thus the relay section 30 is assembled.

Figure 4:
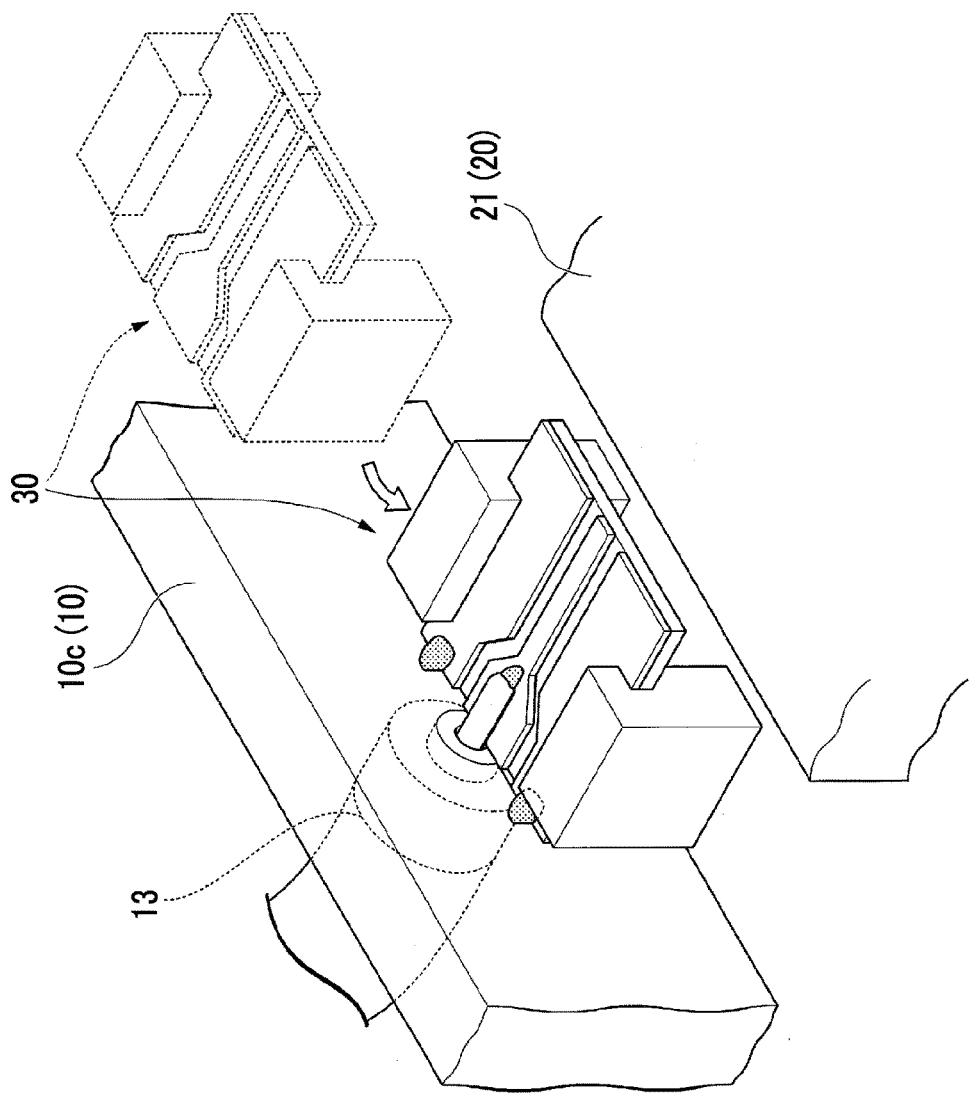
FIG. 4 is an explanatory diagram showing a state of assembling the vicinity of the relay section.

Then, as shown in FIG. 4, the assembled relay section 30 is disposed and fixed at a predetermined position in the housing 10 and in the vicinity of the coaxial connector 13.

A brazing material such as solder, or gold tin is suitably used for the fixing of the relay section 30.

Thereafter, the relay section 30 can be mounted on the housing 10 by electrically connecting the relay section 30 and the electro-optical element 20 or electrically connecting the coaxial connector 13 and the relay section 30.

In this manner, the support parts 32 and 33 are formed separately from the housing 10, whereby adjustment of the relative position or height with the coaxial connector 13 becomes easy. With this configuration, even if a manufacturing error in the manufacture of each constituent member is included with respect to the size of the housing 10, the mounting position of the coaxial connector, or the like, the correction of the error becomes easy.

The support parts 32 and 33 support the relay substrate 31, as described above, whereby an air gap V is formed between a principal surface 311b on the other side of the dielectric substrate 311 and the bottom surface 10x of the housing 10, that is, between the relay substrate 31 and the bottom surface 10x of the housing 10.

The air gap V is provided, whereby when the modulation signal propagates through the relay substrate 31, an electric field easily concentrates on the coplanar line (the signal electrode 312 and the ground electrodes 313 and 314), and thus a radiation loss can be suppressed. Further, even in a case where the frequency of the modulation signal which is input to the relay substrate 31 is increased, the radiation loss can be likewise suppressed.

Further, in the optical device 100, the air gap V is formed by clamping and supporting the relay substrate 31 with the support parts 32 and 33. That is, in formation of the air gap V, working on the dielectric substrate 311 is unnecessary. For this reason, it is possible to suppress a propagation loss of a signal with a simple configuration.

Therefore, according to the optical device 100 having the configuration as described above, it is possible to provide an optical device which suppresses a propagation loss of a signal and realizes high-performance optical modulation.

In the optical device 100 of this embodiment, as the support parts, the support parts 32 and 33 respectively having the slits 321 and 322 are used. However, there is no limitation thereto.

Figure 5:
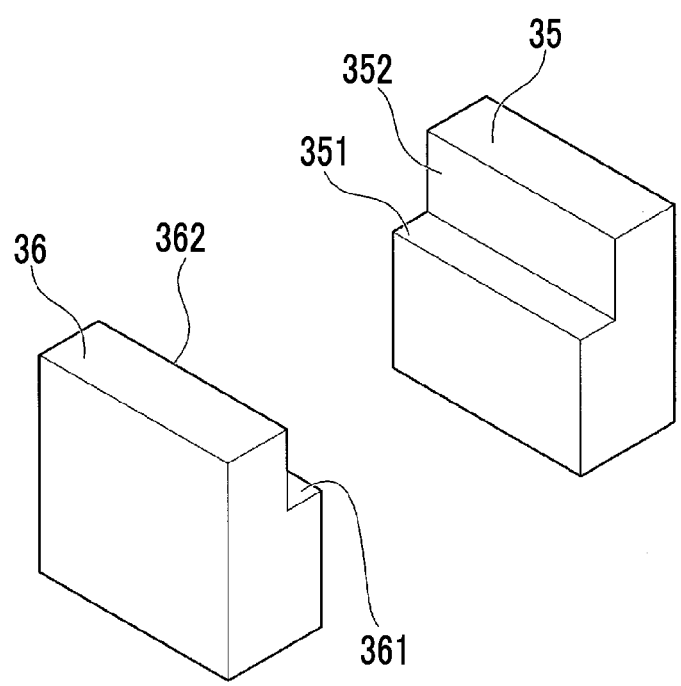
FIG. 5 is a schematic diagram showing a modification example of a support part.

For example, as in support parts 35 and 36 shown in FIG. 5, a configuration having placing surfaces 351 and 361 on which the relay substrate 31 is placed, and wall surfaces 352 and 362 continuous with the placing surfaces 351 and 361, instead of slits, is also acceptable. The wall surfaces 352 and 362 are used as stoppers when the relay substrate 31 is placed on the placing surfaces 351 and 361. In this way, positioning of the relay substrate 31 becomes easy.

A preferred embodiment example according to the present invention has been described above with reference to the accompanying drawings. However, it goes without saying that the present invention is not limited to this example. The shapes, combinations, or the like of the respective constituent members shown in the above-described example are merely examples, and various modifications can be made based on design requirements or the like within a scope which does not depart from the gist of the present invention.

For example, in the embodiment described above, the optical device is set to be an optical modulator which is used for a transceiver or the like on the transmission side in a communication device. However, there is no limitation thereto. The optical device may be, for example, an optical receiver which is used for a receiver or the like on the reception side in a communication device. Further, even if it is an optical switch, the effect of the invention can be likewise obtained.

Further, in the embodiment described above, the optical element of the optical device is set to be an electro-optical element using an electro-optic effect. However, there is no limitation thereto. In the present invention, the optical element of the optical device may be set to be a semiconductor element using an electro-absorption effect, and the optical device may be set to be an electro-absorption modulator.

Further, the optical element may be set to be a quartz-based element or a polymer element using a thermo-optic effect.

Even in this case, with the optical device having the relay substrate having the configuration according to the present invention, it is possible to suppress a propagation loss of a signal and realize high-performance optical modulation.

Further, in the embodiment described above, the relay substrate is used for connection with the coaxial connector to which the modulation signal is input. However, there is no limitation thereto.

For example, unlike the optical device 100 shown in FIG. 1, in a case where a terminal end section is installed outside a housing, it becomes necessary to electrically connect an optical element in the housing and the terminal end section outside the housing. In such a case, a configuration may be made in which a separate connector is provided in the housing, the optical element and the connector are electrically connected to each other by the relay substrate described in the above embodiment, and the connector and the terminal end section outside the housing are electrically connected to each other.

In addition, in an optical modulator, there is a case where an operation is confirmed by connecting a photodiode to a bias control circuit. However, the photodiode and an optical element may be connected to each other by the relay substrate described in the above embodiment.

Even in this case, with the optical device having the relay substrate having the configuration according to the present invention, it is possible to suppress a propagation loss of a signal and realize high-performance optical modulation.

What is claimed is:

1. An optical device comprising:
   an optical element;
   a connector to or from which an electric signal is input or output;
   a relay substrate which electrically connects the connector and the optical element;
   a pair of support parts supporting the relay substrate; and
   a housing to which the connector is fixed and which accommodates the optical element, the relay substrate, and the pair of support parts,
   wherein the optical element includes a substrate having an optical waveguide formed therein, and a modulation electrode formed on a surface of the substrate,
   the relay substrate includes a dielectric substrate, a signal electrode provided on one principal surface of the dielectric substrate, and a ground electrode provided on the one principal surface,
   the signal electrode and the ground electrode are electrically connected to the modulation electrode and the connector,
   the pair of support parts clamps the relay substrate when viewed in a plan view, and an air gap is formed between an other principal surface of the relay substrate and an inner bottom surface of the housing.

2. The optical device according to claim 1, wherein a surface of each of the pair of support parts is formed of a conductive material, and the pair of support parts is electrically connected to the ground electrode and the housing.

3. The optical device according to claim 1, wherein each of the pair of support parts is a member formed separately from the housing, and is fixed to an internal space of the housing.

4. The optical device according to claim 1, wherein each of the pair of support parts has a slit into which a peripheral edge portion of the relay substrate is adapted to be inserted.

5. The optical device according to claim 1, wherein the substrate has an electro-optic effect.

6. The optical device according to claim 1, wherein the signal electrode and the ground electrode form a coplanar line.

7. The optical device according to claim 1, wherein the optical device is an optical modulator.

* * * * *